US011660748B1

(12) United States Patent
Coe et al.

(10) Patent No.: US 11,660,748 B1
(45) Date of Patent: *May 30, 2023

(54) MANAGING ROBOT RESOURCES (71) Applicant: X Development LLC, Mountain View, CA (US)

(72) Inventors: Sarah Coe, Mountain View, CA (US); Nathan Pooley, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/346,900

(22) Filed: Jun. 14, 2021

Related U.S. Application Data

(63) Continuation of application No. 17/027,179, filed on Sep. 21, 2020, now Pat. No. 11,034,021, which is a continuation of application No. 15/963,546, filed on Apr. 26, 2018, now Pat. No. 10,792,813.

(51) Int. Cl.
*G06F 9/50* (2006.01)
*B25J 9/16* (2006.01)

(52) U.S. Cl.
CPC .......... *B25J 9/1661* (2013.01); *G06F 9/5038* (2013.01); *G06F 9/5044* (2013.01)

(58) Field of Classification Search
CPC ...... G06F 9/5038; G06F 9/5044; G06F 9/526; B25J 9/1661
See application file for complete search history.

(56) References Cited

U.S. PATENT DOCUMENTS

| 4,586,151 A | 4/1986 | Buote |
| 4,928,245 A | 5/1990 | Kelly et al. |
| 4,974,191 A | 11/1990 | Amirghodsi et al. |
(Continued)

FOREIGN PATENT DOCUMENTS

| CN | 1542603 | 11/2004 |
| KR | 0161003 | 12/1998 |

OTHER PUBLICATIONS

Roblitz et al., Co-reservation with the concept of virtual resources, 2005, IEEE, p. 398-406 (Year: 2005).*
(Continued)

*Primary Examiner* — Mcdieunel Marc
(74) *Attorney, Agent, or Firm* — McDonnell Boehnen Hulbert & Berghoff LLP (57) ABSTRACT

Methods, systems, and devices for managing robot resources are described. A robot receives from an application a request to reserve a particular set of physical resources of the robot. The robot then determines that each of the physical resources in the set are available to the application and, based on the determination, allocates exclusive use of the particular set of resources to the application by (i) generating a token corresponding to the set of resources, (ii) providing the token to the application, and (iii) updating token data that associates the token with the set of resources. The robot then controls access to the particular set of resources such that, while token data indicates that the token is valid, commands from applications that involve the set of resources are only executed when provided with the token corresponding to the allocation of access to the particular set of resources.

20 Claims, 4 Drawing Sheets

(56) References Cited

U.S. PATENT DOCUMENTS

| | | | |
|---|---|---|---|
| 6,889,118 B2* | 5/2005 | Murray, IV | B25J 9/1666 318/568.13 |
| 7,089,083 B2 | 8/2006 | Yokoo et al. | |
| 7,530,068 B2 | 5/2009 | Clark et al. | |
| 8,452,448 B2 | 5/2013 | Pack et al. | |
| 8,918,209 B2* | 12/2014 | Rosenstein | G06T 7/521 700/250 |
| 9,050,723 B1 | 6/2015 | Elazary et al. | |
| 9,457,468 B1 | 10/2016 | Elazary et al. | |
| 9,513,627 B1 | 12/2016 | Elazary et al. | |
| 9,720,736 B2 | 8/2017 | Kochunni et al. | |
| 9,817,645 B2 | 11/2017 | Nos et al. | |
| 9,975,246 B2* | 5/2018 | Mazel | B62D 57/032 |
| 10,643,266 B2* | 5/2020 | Isaacson | H04W 12/08 |
| 10,792,813 B1* | 10/2020 | Coe | G06F 9/5044 |
| 11,034,021 B1* | 6/2021 | Coe | G06F 9/5038 |
| 2003/0100957 A1 | 5/2003 | Chaffee et al. | |
| 2004/0243281 A1 | 12/2004 | Fujita et al. | |
| 2006/0089739 A1 | 4/2006 | Sheriff et al. | |
| 2006/0217837 A1 | 9/2006 | Koga et al. | |
| 2009/0234499 A1 | 9/2009 | Nielsen et al. | |
| 2012/0197439 A1 | 8/2012 | Wang et al. | |
| 2014/0084165 A1 | 3/2014 | Fadell et al. | |
| 2014/0316566 A1 | 10/2014 | Mazel et al. | |
| 2015/0202770 A1* | 7/2015 | Patron | G06Q 30/0265 901/50 |
| 2016/0277970 A1 | 9/2016 | Werneke et al. | |
| 2017/0102969 A1 | 4/2017 | Kochunni et al. | |
| 2017/0181245 A1 | 6/2017 | Fadell et al. | |
| 2017/0225321 A1 | 8/2017 | Deyle et al. | |
| 2020/0061839 A1 | 2/2020 | Deyle et al. | |
| 2020/0225673 A1 | 7/2020 | Afrouzil et al. | |

OTHER PUBLICATIONS

Brugali et al., Architectural models for global automation systems, 2002, IEEE, p. 487-493 (Year: 2002).*

Rani et al., Resource reservation in grid computing environments: Design issues, 2011, IEEE, p. 66-70 (Year: 2011).*

Lee et al., Issues and Implementation of a URC Home Service Robot, 2007, IEEE, p. 570-575 (Year: 2007).*

Brugali et al., Component-Based Robotic Engineering (Part II), 2010, IEEE, p. 100-112.

en.wikipedia.org [online] "Mutual Exclusion," Last updated on Apr. 20, 2018, retrieved on Apr. 23, 2018, retrieved from URL< https://en.wikipedia.org/wiki/Mutual_exclusion> 6 pages.

Mckee et al., "Resource management for networked robotics systems," IEEE, 1997, 1363-1368.

Mckee et al., Resource management for networked robotics systems, 2002, IEEE, p. 1363-1368.

Mock et al., "Real-time communication in autonomous robot systems," IEEE, 1999, 1-8.

Mock et al., Real-time communication in autonomous robot systems, 1999, IEEE, p. 1-8.

people.cs.pitt.edu [online] "Synchronization Class Notes," retrieved on Apr. 23, 2018, retrieved from Internet: URL<http://people.cs.pitt.edu/~manas/courses/2510/semaphore.html> 5 pages.

Reagin et al., "A component-based software architecture for robotic workcell applications," IEEE, 1999, 85-94.

Wang et al., "Resource sharing in distributed robotic systems based on a wireless medium access protocol (CSMA/CD-W)," IEEE, 1994, 784-791.

www.freertos.org [online] "Queues, Mutexes, Semaphores," retrieved on Apr. 23, 2018, retrieved from Internet: URL<https://www.freertos.org/Real-time-embedded-RTOS-mutexes.html> 2 pages.

www.keil.com [online] "CMSIS-RTOS Version 1.03: Semaphores," Feb. 22, 2018, retrieved on Apr. 23, 2018, retrieved from Internet: URL<https://www.keil.com/pack/doc/CMSIS/RTOS/html/group__CMSIS__RTOS__SemaphoreMgmt.html> 8 pages.

www.webopedia.com [online] "Mutex—mutual exclusion object," retrieved on Apr 23, 2018, retrieved from Internet: URL< https://www.webopedia.com/TERM/M/mutex.html> 3 pages.

* cited by examiner

MANAGING ROBOT RESOURCES

CROSS-REFERENCE TO RELATED APPLICATION

This patent application is a continuation (and claims the benefit of priority under 35 USC 120) of U.S. patent application Ser. No. 17/027,179, filed Sep. 21, 2020, which is a continuation (and claims the benefit of priority under 35 USC 120) of U.S. patent application Ser. No. 15/963,546, filed Apr. 26, 2018, now U.S. Pat. No. 10,792,813, and the entire contents of the prior applications are incorporated by reference herein.

TECHNICAL FIELD

This disclosure relates generally to managing robot resources.

BACKGROUND

Robots can run software applications that may use one or more of the robot's hardware or software resources. For example, an application may control a motorized arm of the robot. If the robot runs several applications concurrently, two or more applications may request permission to use a particular resource during the same time.

SUMMARY

Robots often run software applications to control various operations, actions, and functions of the robot. In some implementations, the operating system of the robot can grant an application exclusive use of one or more of the robot's resources (e.g., a sensor, a camera, motor controls) for a time. For example, a robot may run an application that enables it to play music for an audience. The robot's operating system may allow the music application to have exclusive access to the robot's speaker so that the application can broadcast a song to the audience without interruption.

If the robot's operating system runs several applications concurrently, it is possible that more than one application will request exclusive use of the same resource for the same time. For example, while the music application is using the robot's speaker to broadcast a song, a second user-response application designed to interact with a human user may request access to the speaker to provide an audible response to the user. To manage these potentially conflicting requests for use of the robot's resources, the robot's operating system can implement a lock-based system for managing robot resources. In a lock-based system, when an application desires to use one or more robot resources, the application submits a resource allocation request to an arbiter. If the requested resources are available (e.g., they are not in use by another application), the arbiter generates a token (e.g., a 64-bit number) that it associates with the requested resources and provides that token to the requesting application. The application then uses the resources by submitting the token along with any resource commands. Because the resources are configured to execute only those commands that are accompanied by a valid token, the token acts as a lock on those resources, giving the application exclusive use of them while the token remains valid. When finished using the resources, the application can release (e.g., unlock) them by notifying the arbiter, which then invalidates, or cancels, the token, making the resources available for use by another application. For example, the arbiter can generate a token for the robot's speaker and provide it to the music application. The music application then has exclusive use of the speaker until it notifies the arbiter, when then invalidates its token.

At times, an application may request access to a particular resource that is already being used by another application. In these cases, the arbiter may nonetheless allow the requesting application to use the particular resource (e.g., to preempt the current use) if it determines that the application's request has a higher priority than the current use of the resource. To preempt resource use, the arbiter invalidates the token currently associated with the resource (i.e., the token held by the lower priority application) and generates a new token for the resource that it provides to the requesting application. Because the resource is configured to execute those commands accompanied by valid tokens, the resource will now execute commands from the higher priority application that include the new, valid token, while it will no longer execute any commands from the lower priority application that include the invalidated token. The new application, which now holds the valid token for the resource, thus has exclusive use of that resource until the application releases it or until its use is preempted by a higher priority request. In the example above, if the arbiter determines that the user-response application has a higher priority than the music application, it can invalidate the music application's token, generate a new token for the speaker, and provide that new token to the user-response application. Now, the user-response application has exclusive use of the speaker.

To prevent conflicting use of the robot resources by more than one application, the arbiter tracks the status of the tokens, ensuring that no more than one valid token is associated with any particular resource at any given time. In some implementations, an application may hold more than one valid token at a time (e.g., a token for each resource it is using). In some implementations, an application may hold one token that is associated with multiple resources (e.g., one token for all resources it is using). Also, because each resource can be associated with a different valid token, the arbiter can allow different applications to access different resources concurrently (e.g., by providing different tokens for different resources to different applications).

In some implementations, a method performed by a robot includes (i) receiving, by the robot and from a first application executing on the robot, a first request to reserve a set of physical resources of the robot; (ii) in response to receiving the first request, determining, by the robot, that each of the physical resources in the set are available to the first application; and (iii) in response to determining that each of the physical resources in the set are available to the first application, allocating exclusive use of the set of physical resources to the first application. The robot can allocate exclusive use of the resources to the first application by generating a first token corresponding to the allocation of access to the set of physical resources, providing the first token to the first application in response to the first request, and updating token data maintained by the robot to associate the first token with the set of physical resources. The method further includes, after allocating exclusive use of the set of physical resources to the first application, controlling, by the robot, access to the set of physical resources such that, while token data indicates that the first token is valid, commands from applications that involve the set of physical resources are only executed when provided with the first token corresponding to the allocation of access to the set of physical resources.

In some implementations, generating the first token by the robot includes generating the first token to include a randomly or pseudo-randomly generated component.

In some implementations, the set of physical resources of the robot includes at least one of a motor, an actuator, a joint, an appendage, a limb, an arm, an end effector, a locomotion system, a sensor, a speaker, or a display.

In some implementations, the set of physical resources of the robot includes a subset of physical resources from of a full set of physical resources of the robot and allocating exclusive use of the set of physical resources to the first application is performed while maintaining a previous allocation, to one or more other applications, of different non-overlapping subsets of resources from the full set of physical resources of the robot.

In some implementations, the method further includes, after providing the first token to the first application: (i) receiving an access request that includes a command to control a particular physical resource, wherein the access request provides the first token; (ii) determining that the token data maintained by the robot includes the same first token from the access request and designates that the first token corresponds to an allocation of the particular physical resource; and (iii) executing the command that controls the particular physical resource based on determining that the token data maintained by the robot includes the same first token from the access request and designates that the first token corresponds to an allocation of the particular physical resource.

In some implementations, the method further includes receiving, by an arbiter module of the robot, a control instruction for a particular component of the robot, the control instruction having an associated token and, based on a determination by the arbiter module that the token associated with the control instruction corresponds to the allocation of access to the particular component, providing the control instruction to the particular component.

In some implementations, the method further includes receiving, by an arbiter module of the robot, a control instruction for a particular component of the robot and, based on a determination by the arbiter module that the control instruction is not associated with a token that corresponds to the allocation of access to the particular component, blocking the control instruction from being provided to the particular component.

In some implementations, the method further includes receiving, by the robot and from a second application executing on the robot, a second request to reserve the use of at least one physical resource in the set of physical resources allocated to the first application and determining, by the robot, that the second application has a higher priority than the first application. The method also includes, in response to determining that the second application has a higher priority than the first application, revoking, by the robot, the allocation of the at least one physical resource to the first application by updating the token data to invalidate the first token and issuing, by the robot and to the second application, a second token representing an allocation of access to the at least one physical resource indicated by the second request. In some implementations, the method further includes, in response to determining that the second application has a higher priority than the first application, sending a notification to the first application that indicates that the resources corresponding to the first token are no longer available. In some implementations, updating the token data to invalidate the first token includes removing the first token from the token data or designating the first token data as invalid.

In some implementations, updating the token data maintained by the robot to associate the first token with the set of physical resources includes determining a priority of the first application and storing an indication of the priority of the first application in association with the first token.

In some implementations, receiving the first request to reserve the set of physical resources of the robot includes receiving a preemption preference of the first application and updating the token data maintained by the robot to associate the first token with the set of physical resources includes storing an indication of the preemption preference of the first application in association with the first token.

In some implementations, determining that each of the physical resources in the set are available to the first application includes determining that none of the physical resources in the set of physical resources are currently allocated or determining that none of the physical resources in the set of physical resources are currently allocated to any application having a priority equal to or greater than a priority of the first application.

The described methods and operations can be performed by one or more robots. In some implementations, one or more non-transitory computer-readable media can store instructions that, when executed by one or more computers, cause the one or more computers to perform the described operations.

Certain implementations have particular features and advantages. In some implementations, the system limits complexity and improves efficiency by generating a single token for a group of multiple resources. For example, an application may request access to both the robot's vision system and the robot's wheels so that it can monitor the robot's environment while it moves through a space. Rather than generating individual tokens for the vision system and the wheels, the arbiter can generate a single token that locks both resources and provide the single token to the requesting application.

In some implementations, the system prevents continued use of a resource by an application if one of a group of resources it is using has been revoked. For example, an application may hold a single token for use of a group of resources. If use of one resource of the group of resources is preempted, the arbiter can invalidate the token and thus release all of the resources in the group. To regain access to the released resources, the application can submit a request to the arbiter.

In some implementations, the system ensures high priority requests for resource access are satisfied by preempting resource usage by a lower priority application. To preempt resource usage, the arbiter can invalidate the token held by the currently-using application and issue a new, valid token to the higher priority requesting application.

In some implementations, a requesting application may have the same priority as the application currently using the desired resource. In these cases, the arbiter can use one or more rules to determine whether to preempt the resource usage. For example, the arbiter can use a "tie loses" rule, where the new requesting application is denied use of the resource. Here, the application currently using the resource maintains control of the resource. In some situations, the arbiter may use a "tie wins" rule, where the new requesting application is allowed to use the resource. Here, the arbiter invalidates the token held by the application currently using the resource, generates a new token for the resource, and provides the new token to the requesting application. In some situations, an application may indicate its preferred rule (e.g., "tie loses" or "tie wins"), which the arbiter can then use to determine whether to preempt resource usage. By using different rules in different situations, the arbiter can adjust the resource management to account for differing levels of cooperation among applications.

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like reference numbers and designations in the various drawings indicate like elements.

DETAILED DESCRIPTION

Figure 1:
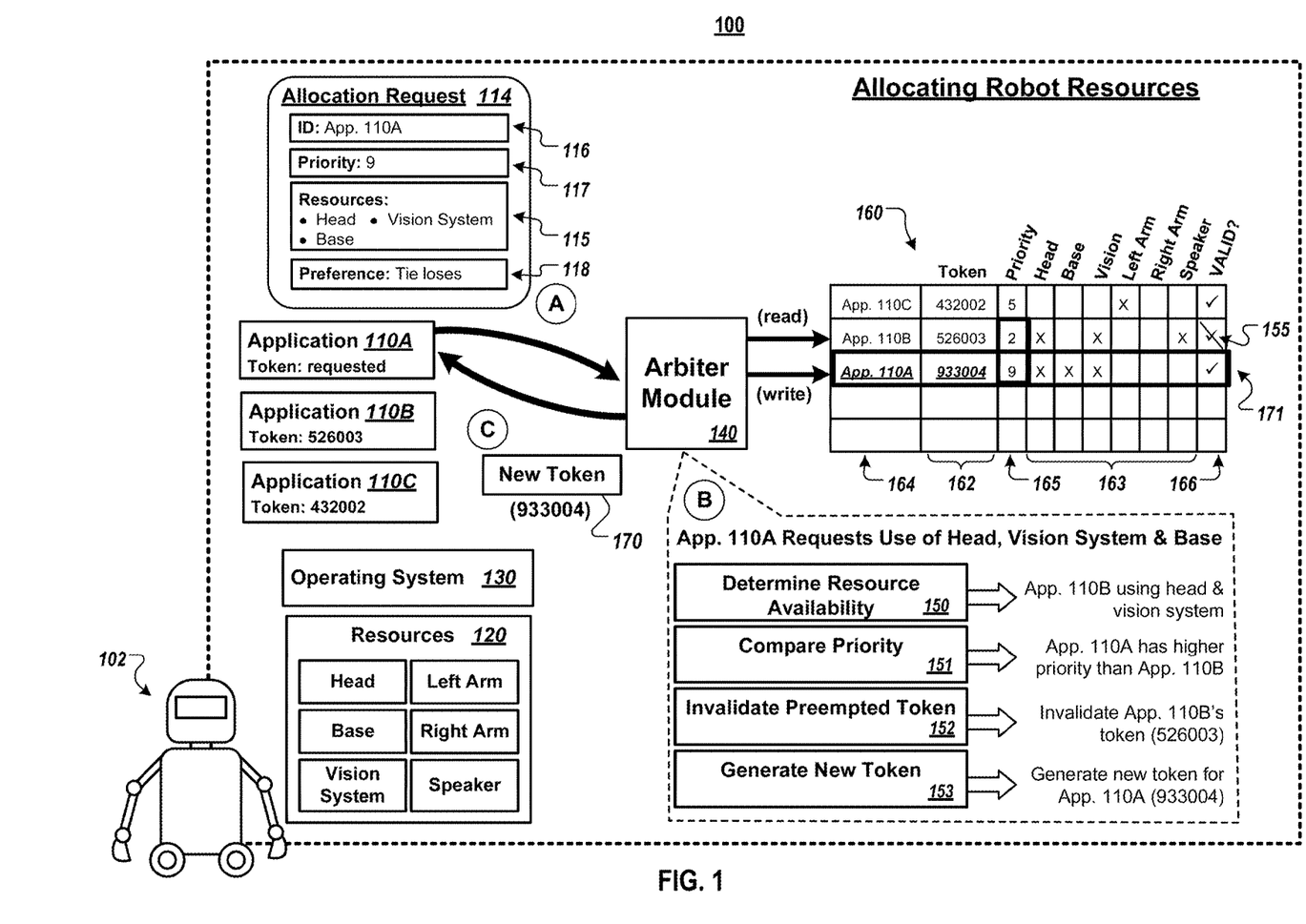
FIGS. 1, 2A, and 2B are diagrams illustrating an example of a system for managing robot resources.

FIG. 1 is a diagram illustrating an example of a system 100 for managing robot resources. The system 100 includes a robot 102, which is equipped with various robot resources 120. The robot resources 120 can be hardware components or subsystems, for instance, sensors, actuators, motor control, or other subsystems of the robot 102. The robot 102 also includes a computer system that can run various applications 110A, 110B, 110C ("the applications 110"), which may request use of or access to one or more of the resources 120.

In FIG. 1, to allocate use of the resources 120 to the applications 110, an operating system 130 of the robot 102 includes an arbiter module 140, which receives requests for resource usage from the applications 110, determines whether the applications 110 can access the requested resources, generates a token to grant an application exclusive use to one or more resources 120, and invalidates a token to revoke an application's access to one or more resources 120. FIG. 1 includes stages (A) through (C), which represent a flow of data.

Generally, the robot 102 of system 100 can be a programmable machine or apparatus capable of executing a series of actions or operations autonomously or semi-autonomously. For example, the robot 102 can be a computer-controlled electromechanical system that is capable of interacting with one or more objects in its surroundings. The robot 102 can operate autonomously, with no human operator intervention, or semi-autonomously, where a human operator provides commands or instructions to the robot 102 to determine some or all of its actions or operations. In some implementations, the robot 102 can be remote-controlled by a human or computer operator.

The robot 102 includes one or more robot resources 120. The resources 120 can include various sensors, devices, systems or subsystems that are resident on or associated with the robot 102. Many robot resources 120 may be physical components of the robot 120 or capabilities provided by those components. Commonly, the resources 120 may include a locomotion system, such as motorized wheels, legs, or treads that enable the robot 102 to navigate its surroundings. The resources 120 can include other motorized systems or actuators, such as a gripper or motorized hand for grasping objects in the robot's surroundings. In some implementations, the resources 120 can include one or more speakers or other devices for generating sound. Other resources may include cargo space or compartments or weight-bearing capacity.

The resources 120 also can include various sensors or input systems of the robot 120. For example, the resources 120 may include a vision system of the robot 102 or one or more cameras mounted on the robot 102. The resources 120 can also include other sensors of the robot 102, for example, LIDAR or radar systems, proximity sensors, force sensors, motion detectors, temperature sensors, humidity or air quality sensors, microphones, or other sensors present on the robot 102. In some implementations, the resources 120 may include one or more recording devices.

The resources 120 can also include hardware or software computing resources of the robot 102. For example, the resources 120 can include a particular graphics processor, memory storage, or other electronic processing unit. The resources 120 may include a particular software program or module. The resources 120 can include communications devices, such as a transmitter or receiver, an antenna, or a communications system. The resources 120 can include a GPS unit. In some implementations, the resources 120 also include one or more devices that enable the robot 102 to display and/or receive data, for example, a touchscreen, an LCD screen, a keyboard, a joystick or mouse, one or more LEDs, lights, or other devices.

In the example of FIG. 1, the robot resources 120 include a motorized head unit that rotates the robot's head, a motorized base unit that moves the robot 102 about its surroundings, motorized left and right arms that can be controlled individually, a robot vision system that includes a RGB-D camera mounted on the robot's head, and a speaker system that enables the robot to generate voice-like responses.

The resources 120 are controlled by a computer system of the robot 102. The computer system includes both hardware and software configured to processes data and instructions to cause the robot 102 to perform various actions or operations using the resources 120. The robot's computer system can include general-purpose hardware, such as one or more central processing units (CPU) or other general-purpose processors, one or more memory systems, as well as specialized computing hardware, such as one or more graphics processing units (GPUs), embedded processing systems, including field-programmable gate arrays, microcontrollers, application-specific integrated circuits (ASICs), and/or other specialized hardware. In some implementations, processing by the computer system is performed by hardware physically resident in or on the robot 102. In some implementations, the computer system of the robot 102 communicates with a remote computer system (e.g., a server system or a cloud computing platform) to perform various processing operations.

The computer system of the robot 102 includes an operating system 130. The operation system 130 is a software component that, among other operations, manages the various hardware and software resources of the robot 102, including the resources 120. For example, the operating system 130 may schedule tasks, manage CPU usage, and allocate memory to enable one or more computer-implemented programs to execute on the computer system of the robot 102.

In the system 100, the operating system 130 manages the execution of the applications 110. The applications 110 can be, for example, software programs stored in a memory system of the robot 102 and configured to cause the robot 102 to perform one or more actions or operations when executed. The applications 110 can be native to the robot 102 (e.g., written by an owner or provider of the robot 102) or they can be third-party applications 110, written by an individual or organization other than the owner of the robot 102. In some situations, the operating system 130 coordinates operations of the computer system such that the applications 110 execute concurrently using the computing resources of the robot. In the example of FIG. 1, the system 100 includes three applications 110A, 110B, and 110C that are run concurrently by the robot's operating system 130.

During the course of execution, the applications 110 may request access to or use of one or more of the robot resources 120. For example, a navigation application 110A that is configured to cause the robot 102 to travel from one side of a room to another side may request permission to use the robot's motorized base to generate the locomotive force necessary to move the robot 102 between locations. The application 110A may also request permission to use the robot's vision system (e.g., a camera mounted on the robot's head) and head motor control so that it can monitor the room for obstacles as the robot 102 moves. The operating system 130 can grant the application 110A exclusive use of the robot's vision system, motorized head, and motorized base to ensure that the robot 102 can move safely from one side of the room to another side without colliding with an obstacle. Granting exclusive use of one or more resources 120 allows the application 110A to retrieve data from, send commands to, or otherwise control the one or more resources 120 without interruption from another application that also desires to use the resource.

In some cases, more than one application 110A, 110B, 110C may request permission to use a particular robot resource 120 for the same time. In many cases, such concurrent use of a robot resource 120 by multiple applications 110 is undesirable. For instance, in the example above, if the music application and the user-response application both attempt to use the robot speaker at the same time, the speaker may simultaneously broadcast music and a response to the user, which may result in a garbled sound output. As another example, if two applications attempt to use the robot's motorized arm at the same time, but send conflicting motor commands (e.g., one commands the arm to move left while the other commands the arm to move right), the robot arm may not move at all, or may move in an undesired way (e.g., the arm may move back and forth).

To prevent conflicting and/or undesirable use of the robot resources 120, the operating system 130 can implement a lock-based system for allocating use of shared robot resources 120. The lock-based system can ensure that, at any given time, a particular resource 120 is allocated for the exclusive use of no more than one application 110A, 110B, or 110C. In system 100, to allocate use of the shared robot resources 120 among the multiple applications 110A, 110B, 110C, the operating system 130 includes an arbiter module 140, which can be implemented in any combination of hardware and/or software. The arbiter module 140 manages a system of tokens for granting exclusive use of one or more of the resources 120 to a particular application 110A, 110B, 110C.

In some implementations, the allocation of resources by the arbiter module 140 includes three stages (A) through (C), as shown in FIG. 1. Briefly, in stage (A), an application 110A, 110B, or 110C requests use of one or more resources 120. In stage (B), if the requested resources are available (e.g., they are not in use by another application), the arbiter 140 generates a new token corresponding to the particular group of requested resources. The token can be, for example, a 64-bit integer, a number, a lock, or another computing object designating exclusive assignment of a particular group of resources to a particular application. In the system 100 of FIG. 1, the token is a six-digit integer. If one or more of the requested resources are currently being used by another application (e.g., they are locked by that application's token) and the arbiter determines that the requesting application should preempt the current resource use, the arbiter 140 can invalidate the existing token for those resources (e.g., invalidate the token held by the currently-using application). The new token generated by the arbiter 140 then becomes the "valid" token for the particular group of resources requested by the application 110A. In stage (C), the arbiter 140 provides the new token to the requesting application 110A. When the application 110A subsequently sends commands to control the resources 120, it includes this includes this valid token along with any commands it sends to the resources 120. Because the resources 120 are configured to execute only those commands accompanied by a valid token, the application's possession of a valid token for a particular resource effectively locks that resource, giving the application exclusive access and use to it while the token remains valid.

In more detail, in stage (A), the application 110A requests use of one or more robot resources 120 by sending an allocation request 114 to the arbiter module 140. For example, the application 110A may send the request 114 through an application programming interface (API) implemented by the operating system 130. The request 114 indicates the one or more resources 115 that the application 110A desires to access or use.

The request 114 also includes information related to the identity of the requesting application and/or the priority of the request 114. The request 114 can include an identifier 116 that indicates the particular requesting application. The request 114 can also include a priority 117 that indicates the relative priority of the allocation request 114. For example, a request 114 for resource usage by an application performing core functionality, such as responding to a user or navigating a space, may have a relatively high priority 117, while an application performing peripheral functionality, such as playing music or waving a robot arm, may have a relatively low priority 117.

In some implementations, the priority 117 may an integer or decimal value within a range of values (e.g., an integer between "0" and "9") that indicates the priority or importance of the request 114 relative to other resource uses. The priority 117 can also be another ordinal value (e.g., "low," "medium," "high") indicating a comparative ranking of the request 114 relative to other resource usage. In the system 100 of FIG. 1, the priority 117 is an integer ranging from "0" and "9," where "0" indicates the lowest relative priority and "9" indicates highest relative priority. In some implementations, the applications 110 determine the priority 117 of the allocation request 114. In other implementations, the arbiter module 140 can determine the priority 117 of a particular request 114.

The priority 117 of a request 114 can be based on a various factors or combinations of factors. For example, the priority 117 of the request 114 can be based on the priority of the requesting application (e.g., all resource allocation requests 114 submitted by a high-priority application 110A have a "high" priority 117). This may be the case when the high-priority application 110A performs core functions for the robot 102. In other cases, the priority 117 of the request 114 can be based on the particular resource being requested (e.g., the application 110A may label a particular request 114 as high priority if the request relates to an essential operation, but may label the request 114 as low priority if the request relates to an optional operation). The arbiter module 140 can use the priority 117 included in the request 114 to adjudicate requests from multiple applications 110 for use of the same resource 120.

In some implementations, the allocation request 114 also includes a preemption preference 118. The preemption preference 118 indicates the application's preferred approach for preempting resource use in the case that one or more of the requested resources 115 are already in use by another application that shares the same priority. The preemption preference 118 for these "tie-breaking" situations is described in greater detail in stage (B) below.

In stage (A) of the example of FIG. 1, the application 110A sends the allocation request 114 to the arbiter module 140. The request 114 includes the identifier 116 indicating the application 110A, the priority 117 of "9" (indicating a high priority for this request 114), and resources 115 including the robot's head, vision system, and base. The example request 114 could arise, for instance, if the application 110A is configured to navigate the robot 102 through a room, where use of the robot's vision system is required to monitor the space for obstacles, use of the robot head is necessary to pan the area observed by the vision system, and use of the robot base is necessary to generate the locomotive force necessary to move the robot 102 through the room.

In stage (B), after receiving the allocation request 114, the arbiter module 140 determines whether to allocate the requested resources 115 to the requesting application 110A. In some implementations, the arbiter module 140 performs some or all of process 150 through 153 to determine whether to allocate the resources 115 specified in the request 114.

In process 150, the arbiter module 140 determines the availability of the requested resources 115. In some implementations, to determine the availability of resources, the arbiter 140 accesses token data 160, which may be stored in a local memory system of the robot 102. The token data 160 includes information related to existing or previously issued tokens that reserve use of the resources 120. In FIG. 1, the token data 160 includes a list of the issued tokens 162. For each token in the list 162, the data 160 indicates the resources 163 associated with that token (e.g., those resources 163 locked by the token), as well as the application 164 that holds the token. The data 160 also includes the priority 165 associated with the token, which can be, for example, the priority 117 of the request 114 that prompted the generation of the token. In some implementations, the data 160 also includes indications of token validity 166, which specify whether the particular token is currently valid.

In the example of FIG. 1, the first two entries of the token data 160 represent the existing tokens when the application 110A sends its resource allocation request 114 in stage (A). Here, the first entry indicates that application 110C currently holds token "432002" for use of the robot's left arm. Furthermore, the data 160 indicates that the token "432002" is valid and has a priority of "5." By holding the valid token "432002," the application 110C has exclusive use of the robot's left arm.

The second entry of the data 160 indicates that application 110B currently holds token "526003" for the use of the robot's head, vision system, and speaker. The token "526003" is initially valid at the time of application 110A's request and has a priority of "2." At the time the application 110A sends the request 114, the application 110B has exclusive use of the robot's head, vision system, and speaker.

In process 150, the arbiter module 140 uses the token data 160 to determine whether the requested resources 115 are available for the requesting application 110A or whether one or more of the resources 115 are reserved, and thus locked, by another application. In the example of FIG. 1, the application 110A requests use of the resources 115 that include the robot's head, vision system, and based. Based on the token data 160, the arbiter 140 determines that, while the robot's base is not reserved, the robot's head and vision system are currently reserved and locked by application 110B.

If all of the resources 115 are available (e.g., none of the resources 115 are reserved by another application), the arbiter module 140 grants the requesting application use of the group of resources 115 by generating a new token, as described in process 153 below. However, if, as in the example of FIG. 1, one or more of the requested resources 115 are currently locked by another application, the arbiter 140 can compare the priorities of the requesting and using applications to determine whether the arbiter 140 will preempt the current use of the desired resources (process 151).

If the allocation request 114 has a priority lower than the priority of the valid token currently associated with the resource in use (e.g., the token held by the application currently using the requested resource), the arbiter module 140 may determine that the application 110A's request 114 for resource usage must be denied. In this case, the arbiter 140 can send a message to the requesting application indicating that its request was denied. In some implementations, the arbiter 140 may allow the requesting application 110A to access those requested resources that are not in use (e.g., by issuing a token for the group of unused resources) while also sending a message to the application 110A indicating that it does not have access to those resources currently reserved by other applications. If the allocation request 114 has a priority higher than the priority of the valid token currently associated with the resource in use, the arbiter module 140 can preempt use of the resource, revoking access by the currently-using application and granting access to the resource by the requesting application 110A.

In the example of FIG. 1, the arbiter module 140 compares the priority 117 of application 110A's allocation request 114 ("9") to the priority of application 110B's existing token ("2") for use of the robot's head and vision system. Because the priority 117 of request 114 is higher than the priority of the existing token, the arbiter 140 determines that it can preempt use of the robot's head and vision system by the currently using application 110B to grant exclusive use of those resources to the requesting application 110A.

In process 152, the arbiter module 140 preempts use of a resource by invalidating the token held by the application currently using the resource. To invalidate a token, the arbiter 140 may change the validity data 166 associated with the token's entry in the token data 160, remove the token's entry from the token data 160, or otherwise indicate that the token is no longer valid. In some implementations, the arbiter 140 informs the application holding the token that its token is no longer valid, for example, by sending a message to the application. In the example of FIG. 1, the arbiter 140 invalidates application 110B's token ("526003") by changing the validity data for the token's entry to indicate that the token is invalid (arrow 155). In FIG. 1, the record for the invalidated token is retained in FIGS. 1, 2A, and 2B for illustrative purposes. The arbiter module 140 may simply invalidate tokens by deleting the corresponding records from the token data 160. Then, when a request including an invalidated token is evaluated, the arbiter module 140 would find that the token is not indicated in the token data 160 and so does not provide any authorization. As an alternative, in some implementations, the arbiter module 160 may retain some records of invalidated tokens. For example, so the arbiter module 160 may use records of invalidated tokens to notify an application whose resource reservation was previously interrupted (e.g., preempted by a higher-priority application) that the resources have become available, which may prompt the application to request a new resource allocation.

By invalidating the token, the arbiter module 140 releases all of the resources reserved by that token, not only the resource included in the allocation request 114. In the example of FIG. 1, this means that not only the robot's head and vision system, which are included in the requested resources 115, are released, but the speaker is released, as well, and made available for use by other applications. To resume use of the speaker, the application 110B can send an allocation request to the arbiter 150 requesting use of the speaker.

In some implementations, rather than invalidating the token and releasing all resources associated with it, the token retains its validity, but the arbiter module 140 disassociates the particular preempted resource from the token. In this way, the application that holds the token can continue using those resources that have not been preempted, while the arbiter 140 can allow the higher priority requesting application to use the particular preempted resource.

In process 153, the arbiter module 140 allows the requesting application 110A to access the resources 115 by generating a new token 170. As noted above, the token 170 can be, for example, a 64-bit integer, a number, a lock, or another designating exclusive assignment of a particular group of resources to a particular application. In some implementations, all or part of the token 170 is generated randomly or pseudo-randomly, enhancing system security by making it more difficult for a malicious application to determine and co-opt a particular token. In some implementations, a part of the token 170 can be generated sequentially to track the sequence that tokens were issued. In the example of FIG. 1, the token is a six-digit integer, where the first three digits are generated randomly and the final three digits are assigned sequentially.

In FIG. 1, the arbiter 140 generates a new token 170 with a value of "933004" that reserves the requested resources 115 (i.e., the robot head, base, and vision system) for the application 110A. The arbiter 140 stores the token information 171, including the application that will hold the token, the token value, the reserved resources, and the indication of token validity, in the token data 160.

In stage (C), the arbiter module 140 provides the new token 170 to the requesting application 110A. The application 110A then includes the token 170 in subsequent commands sent to access, control, or otherwise make use one or more of the resources 115 (i.e., the robot's head, vision system, or base).

In some implementations, rather than generating a new token related to one or more requested resources, the system 100 can add the one or more requested resources to an existing valid token or lock held by the requesting application. For example, in FIG. 1, if the application 110A already held a valid token providing it exclusive access to another resource (e.g., to the robot's right arm), rather than generating a new token for the requested resources 115 (i.e., the robot's head, vision system, and base), the arbiter module 140 can grant the application 110A exclusive use of the requested resources 115 by associating those resources 115 with the existing token held by the application 110A.

Similarly, in some implementations, rather than releasing all of the resources associated with a particular valid token by invalidating the token, the system 100 can release reserved resources individually by disassociating the released resource from the valid token. For example, in FIG. 1, if, after having been granted access to the resources 115 (i.e., the robot's head, vision system, and base), the application 110A determines that it no longer requires use of the robot's base, the arbiter module 140 can remove the robot's base from the lock by disassociating it from the token 170, making the robot's base available for use by another application while retaining the application 110A's access to the robot's head and vision system.

In some cases, in process 151, the arbiter module 140 may determine that the priority 117 of the pending allocation request 114 is the same as the priority of an existing token that currently reserves one or more of the requested resources 115. To determine whether to preempt the current use of the resources, the arbiter 140 can use any of various "tie-breaking" rules.

For example, in some implementations, the arbiter module 140 can use a "tie loses" rule, where the currently-using application 110B retains exclusive use of the resources and the requesting application 110A is denied use. In this case, the arbiter 140 may send a message to the requesting application 110A indicating that its request for resource has been denied.

In some implementations, the arbiter 140 uses a "tie wins" rule, where the requesting application 110A preempts the currently-using application 110B. In this case, the arbiter 140 invalidates the token held by the currently-using application 110B, generates a new token for the requested resources 115, including the preempted resource, and provides that new token to the requesting application 110A.

In some implementations, the requesting application 110A provides a preemption preference 118 in its allocation request 114. Here, the arbiter module 140 can use the preemption preference 118 to determine tie-breaking behavior. For example, in FIG. 1, the preemption preference 118 is "tie loses," indicating that, when the priority 117 of the request 114 is the same as the priority of an existing token that reserves one of the requested resources 115, the arbiter 140 will not preempt the existing token to satisfy the allocation request 114. By allowing the applications 110 to specify a preemption preference 118 in their allocation requests 114, the system can manage cooperative resource actions among the applications 110.

Figure 2A:
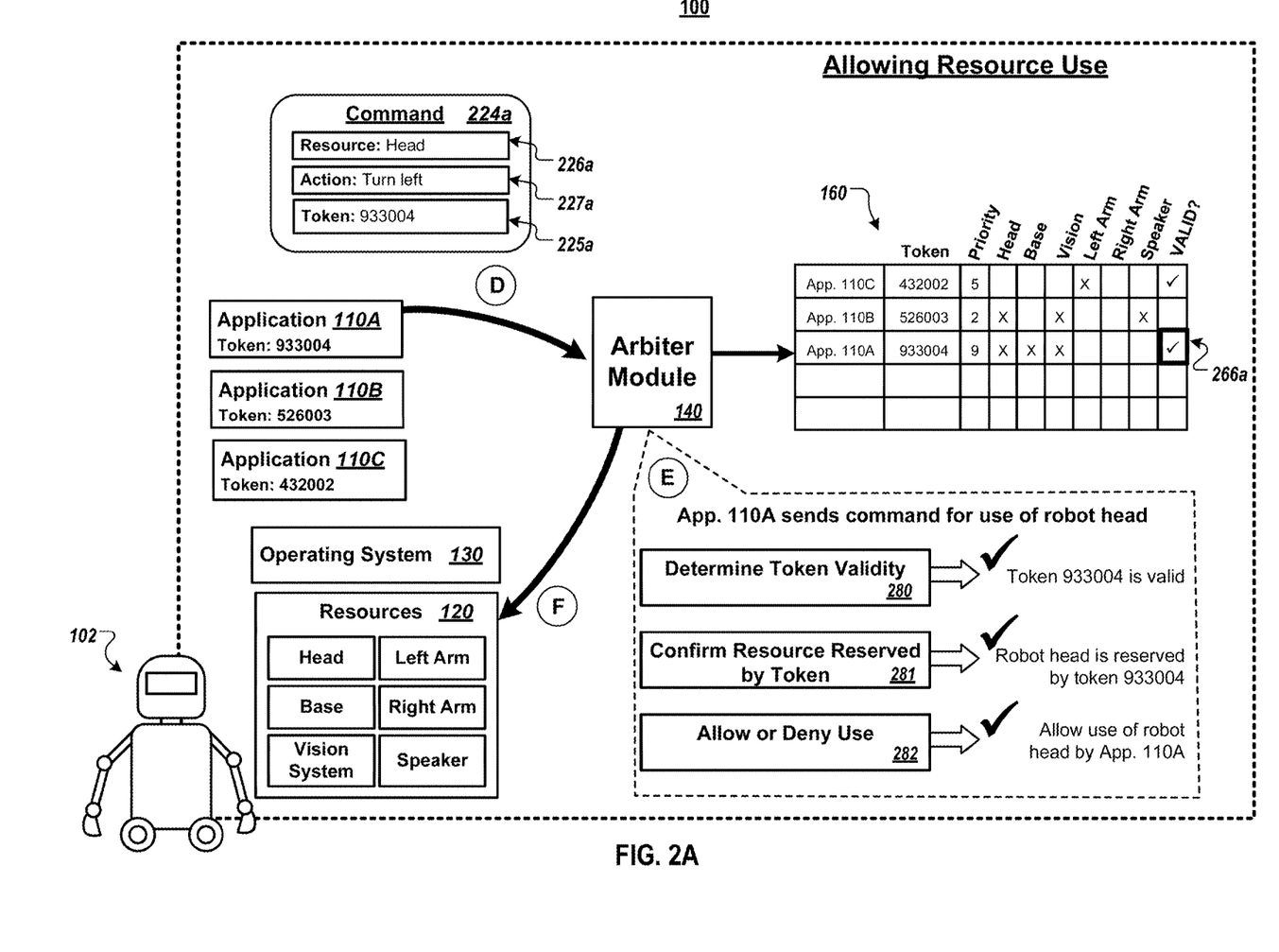
Figure 2B:
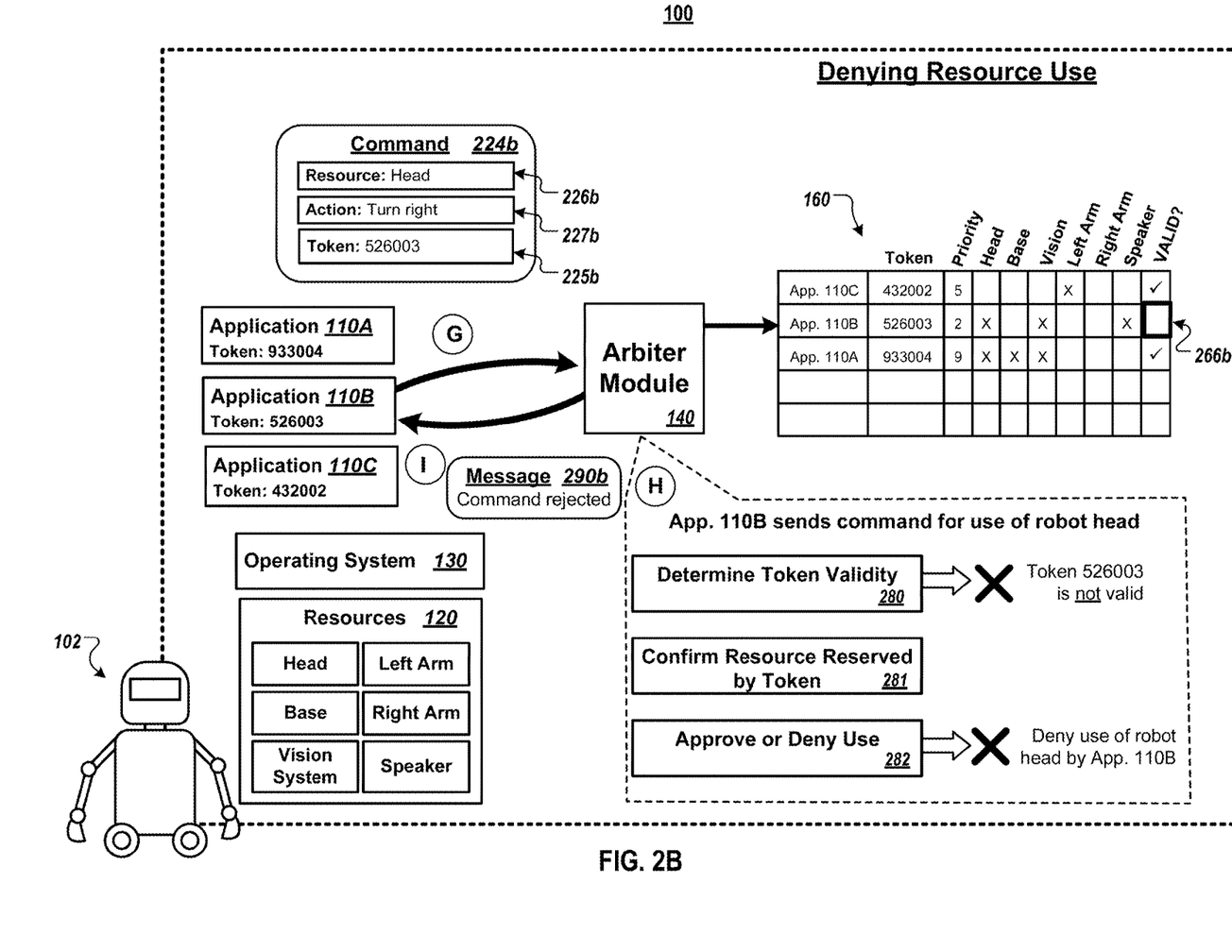

FIGS. 2A and 2B illustrate examples of resource usage for the particular resource allocation determined in the example of FIG. 1. To use a particular robot resource, an application 110 sends a command that includes a token to the arbiter module 140. If the arbiter 140 determines that the token is valid for the particular resource, the arbiter 140 forwards the command to the resource, which can then execute the command. If the arbiter 140 determines that the token is invalid, or that no token is present, the arbiter 140 may not forward the command to the resource, but may instead provide a message to the requesting application indicating that it does not have access to the specified resource (e.g., a message indicating that its token is invalid).

FIG. 2A is a diagram illustrating an example of allowing resource use in the system 100 for managing robot resources. As established in the example of FIG. 1, the application 110A has been issued a valid token "933004" for use of the robot's head, base, and vision system.

In stage (D) of FIG. 2A, the application 110A sends to the arbiter module 140 a command 224a to use a resource 226a. In this example, the command 224a directs the robot's head (resource 226a) to turn left (action 227a). In addition to specifying the resource 226a and the action 227a, the command 224a includes a token 225a for using the specified resource 226a. Here, the application 110A includes its token 225a, "933004."

In stage (E), the arbiter module 140 performs processes 280 through 282 to determine whether the commanding application 110A is permitted to use the resource 226a. If the arbiter 140 determines that the application 110A is permitted to use the resource 226a, the arbiter 140 can forward the command 224a to the resource 226a for execution. If the arbiter 140 determines that the application 110A is not permitted to use the resource 226a (e.g., the resource is locked by another application), the arbiter 140 can send a message to the application 110A indicating that it does not have access to the specified resource.

In process 280, the arbiter module 140 determines the validity of the token 225a included in the command 224a, for example, by accessing the token data 160. If the token data 160 indicates that the token 225a is valid, in process 281 the arbiter 140 confirms that the specified resource 226a is reserved by the valid token 225a. If the token 225a is valid and reserves the specified resource 226a, in process 282, the arbiter 140 determines that the commanding application 110A is allowed to use the resource 226a.

In the example of FIG. 2A, after receiving the command 224a that includes the token 225a ("933004"), the arbiter module 140 accesses the token data 160 and determines that the token 225a is valid (arrow 266a). Based on the token data 160, the arbiter 140 further confirms that the resource 226s (the robot's head) is reserved by the valid token 225a. Because the token 225a is valid and reserves the resource 226a, the arbiter 140 determines that the commanding application 110A is allowed to use the resource 226a.

Because the arbiter module 140 determined that the application 110A has a valid token for the specified resource, in stage (F), the arbiter 140 forwards the command 224a to the robot's head (the resource 226a) for execution.

If the arbiter module 140 determines that the token provided by the commanding application is not valid, or that the token does not reserve the specified resource, the arbiter 140 can deny the commanding application use of the specified resource. FIG. 2B is a diagram illustrating an example of denying resource use in the system 100 for managing robot resources. In FIG. 2B, the application 110B holds the token "526003." However, as shown in FIG. 1, the application 110B's resource usage was preempted by the allocation request 114 of the application 110A and, as result, the application 110B's the token ("526003") is no longer valid.

Referring now to FIG. 2B, in stage (G), the application 110B sends to the arbiter module 140 a command 224b to use a resource 226b. Here, the command 224b directs the robot's head (resource 226b) to turn right (action 227b). In addition to specifying the resource 226b and the action 227b, the command 224b also includes a token 225b for using the specified resource 226b. Here, the application 110B includes its token 225b, "526003."

In stage (H), the arbiter module 140 accesses the token data 160 to determine the validity of the token 225b (process 280). Based on the token data 160, the arbiter 140 determines that the token 225b ("526003") is not valid (arrow 266b). Because the token 225b is invalid, the arbiter 140 denies use of the specified resource 226b by the application 110B (process 282). Similarly, had the arbiter 140 determined that the token 225b was valid, but did not reserve the specified resource 226b, the arbiter 140 would also deny use of the resource 226b by the application 110B.

Because the arbiter 140 denied application 110B use of the resource 226b, the arbiter 140 does not forward the command 224b to the resource for execution. Instead, the arbiter 140 sends a message 290b to the application 110B indicating that the command was rejected and use of the resource denied. The message 290b may also contain an indication that the token 225b is invalid, that the specified resource 227b is not reserved by the token 225b, or another message indicating the reason for the command rejection.

Figure 3:
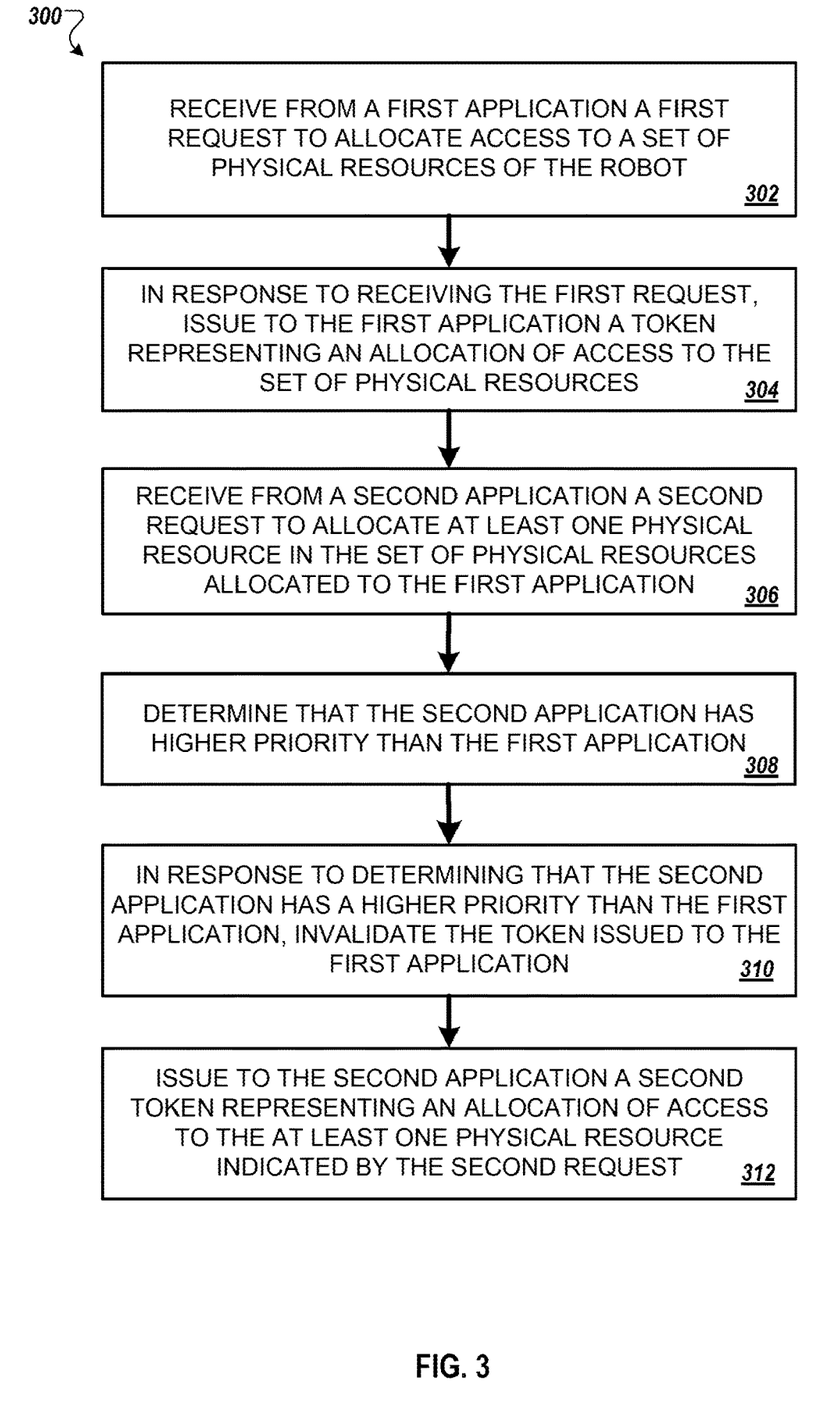
FIG. 3 is a flow diagram illustrating an example of a method for managing robot resources.

FIG. 3 is a flow diagram illustrating an example of a method 300 for managing robot resources. The method 300 can be performed, for example, by a robot. In some implementations, the method 300 is performed by an operating system or other computing system of a robot. Briefly, the method 300 includes receiving, from a first application, a first request to reserve a set of physical resource of the robot (302); in response to receiving the first request, determining that each of the physical resources in the set are available to the first application (304); in response to determining that each of the physical resources in the set are available to the first application, allocating exclusive use of the set of physical resources to the first application (306); after allocating exclusive use of the set of physical resources to the first application, control access to the set of physical resources (308).

In more detail, the robot can receive from a first application executing on the robot a first request to reserve a set of physical resources of the robot (302). The first application can be, for example, a software application executed by an operating system of the robot, where the application sends the first reservation request through an API of the robot. The application can request to reserve use of or access to any one or more physical resources of the robot, including, for example, a motor or motor system of the robot, an actuator, a joint, an appendage, a limb, an arm, an end effector, a locomotion system, a sensor, a speaker, or a display of the robot.

In response to receiving the first request, the robot can determine that each of the physical resources in the set are available to the first application (304). In some implementations, the robot determines that the resources in the set are available by accessing token data maintained by the robot, where the token data indicates those physical resources reserved by one or more applications. For example, the robot can associate a token with a particular set of physical resources reserved by an application and store the token in the token data. The token can be, for instance, a number (e.g., a 64-bit integer), a lock, or another record or computing object that designates exclusive assignment of the resources to the application. The robot can determine that each of the physical resources in the set are available to the first application by determining that none of the physical resources in the set are currently allocated to another application, as indicated by the token data.

In response to determining that each of the physical resources in the set are available to the first application, the robot can allocate exclusive use of the set of physical resources to the first application (306). In some implementations, the robot allocates exclusive use of the set of resources by generating a first token corresponding to the allocation of access to the set of resources. In some implementations, the first token includes a randomly or pseudo-randomly generated component. The robot then provides the first token to the first application in response to the first request and updates the token data maintained by the robot to associate the first token with the particular set of reserved physical resources.

In some cases, the robot may also determine a priority of the first application and store in the token data an indication of the first application's priority in association with the first token. When the token data stores an indication of an associated application's priority, the robot may determine that the resources in the set are available to a requesting application by determining that none of the physical resources in the set of physical resources are currently allocated or by determining that none of the physical resources in the set of physical resources are currently allocated to any application having a priority equal to or greater than a priority of the first application.

In some implementations, the set of physical resources may be a subset of resources from a full set of physical resources of the robot. Here, the robot can allocate exclusive use of the requested set of physical resources to the first application while maintaining a previous allocation of different, non-overlapping subsets of resources to one or more other applications. For example, the robot may have physical resources that include a motorized base, two motorized arms, a motorized head, a vision system, a microphone, a speaker, and a display. A first application configured to audibly interact with a user may request exclusive use of only the microphone and the speaker. A second application configured to move the robot may have already been granted exclusive use of the subset of resources that include robot's vision system and motorized base. Because the resources already allotted to the second application (i.e., the vision system and the motorized base) do not overlap with the resources requested by the first application (i.e., the microphone and the speaker), the robot can allocate the requested set of resources to the first application while maintaining the allocation of resources already granted to the second application.

After allocating exclusive use of the set of physical resources to the first application, the robot can control access to the set of physical resources (308). The robot can be configured such that while token data indicates that the first token is valid, commands from applications that involve the set of physical resources are only executed when provided with the first token corresponding to the allocation of access to the set of physical resources. For example, the robot may generate and provide to the first application a first token that reserves access to a set of physical resources of the robot. After providing the first token to the first application, the robot may receive an access request that includes a command to control a particular physical resource of the set of resources. The access request may also provide, with the command, the first token. By accessing token data maintained the robot, the robot may determine that the first token is valid (e.g., that the token data includes the same first token from the access request) and that the first token corresponds to an allocation of the particular physical resource associated with the command. Based on these determinations, the robot can execute the command that controls the particular physical resource.

In some implementations, the robot may include an arbiter module, which can be, for example, a processing module implemented in any combination of hardware and software. The arbiter module of the robot can receive a control instruction for a particular component or physical resource of the robot, where the control instruction has an associated token. The arbiter module can determine that the token associated with the control instruction corresponds to the allocation of access to the particular component and, based on the determination, provide the control instruction to the particular component. After receiving the control instruction, the particular component can execute the operation indicated by the instruction.

In some cases, the arbiter module may determine that the control instruction is not associated with a token that corresponds to the allocation of access to the particular component. In these cases, the arbiter module can block the control instruction from being provided to the particular component. Instead of providing the control instruction to the particular component, the arbiter module may provide a message or notification to the application that sent the instruction indicating that the associated token is not valid for the requested particular component.

In some implementations, the robot can receive from a second application a second request to reserve the use of at least one physical resources in the set of physical resources already allocated to the first application. Here, the robot can determine that the second application has a higher priority than the first application, for example, by comparing a priority associated with the second request to the priority of the first application stored in the token data. In response to determining that the second application has a higher priority than the first application, the robot can revoke the allocation of the at least one physical resource to the first application by updating the token data to invalidate the first token and then issue, to the second application, a second token representing an allocation of access to the at least one physical resource indicated by the second request. The robot can invalidate the first token by, for example, updating the token data by removing the first token record from the data or otherwise designating in the token data that the first token is invalid. The robot can issue the second token to the second application by (i) generating a new, second token that corresponds to the allocation of access to the at least one physical resource indicated by the second request, (ii) providing the second token to the second application, and (iii) updating the token data maintained by the robot to associate the second token with the physical resources indicated by the second request.

In some implementations, if the robot determines that the second application has a higher priority than the first application, it can send a notification to the first application indicating that the resources corresponding to the first token are no longer available (e.g., the first token has been invalidated).

In some implementations, along with a request to reserve a set of physical resources, the robot may also receive a preemption preference of the requesting application. The preemption preference can indicate the requesting application's preferred rule for determining resource preemption for situations in which an application requests access to a particular resource that is already reserved by another application. For example, the preemption preference may indicate that in cases where another application requests access to an already reserved resource, the requesting application should be given access to the resource (e.g., "tie wins"). Alternatively, the preference may indicate that the requesting application should be denied access to the resource and the application that has already reserved the resource should maintain exclusive use of the resource (e.g., "tie loses"). The robot can update the token data to store an indication of the preemption preference associated with the token reserving the set of physical resources. The robot can then access and use the preemption preference associated with a particular reserved resource to determine whether a subsequent request to reserve that resource should be denied or allowed.

The features described can be implemented in digital electronic circuitry, or in computer hardware, firmware, software, or in combinations of them. The techniques can be implemented in a computer program product tangibly embodied in an information carrier, e.g., in a machine-readable storage device, for execution by a programmable processor; and method processes can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method performed by one or more computing devices, the method comprising:
   receiving, by the one or more computing devices, a request to access or reserve access to a resource of a robot, the request being associated with a first module of the robot;
   determining, by the one or more computing devices, a priority level associated with the request;
   determining, by the one or more computing devices, that the priority level associated with the request exceeds a priority level of an existing first reservation that reserves access to the resource for a second module of the robot; and
   in response to determining that the priority level associated with the request exceeds the priority level of the first reservation:
   cancelling, by the one or more computing devices, the first reservation to remove authorization of the second module to access the resource of the robot; and
   based on the request, generating, by the one or more computing devices, a second reservation that authorizes the first module to access to the resource of the robot.

2. The method of claim 1, wherein the one or more computing devices are one or more computing devices of the robot.

3. The method of claim 1, wherein the resource is a physical resource of the robot.

4. The method of claim 1, wherein the first module and the second module are different software applications of the robot.

5. The method of claim 1, further comprising notifying the second module that the first reservation is cancelled.

6. The method of claim 1, wherein the first reservation is associated with a corresponding token; and
   wherein cancelling the first reservation comprises invalidating the token for the first reservation.

7. The method of claim 6, wherein generating the second reservation comprises:
   associating a token with the second reservation; and
   providing the token to the first module of the robot.

8. The method of claim 1, wherein the resource is one of multiple resources of the robot that are reserved by the first reservation;
   wherein cancelling the first reservation comprises cancelling the reservation of each of the multiple resources associated with the first reservation.

9. The method of claim 1, comprising receiving an identifier for the first module in association with the request;
   wherein determining the priority level associated with the request comprises determining the priority level based on the identifier for the first module.

10. The method of claim 1, wherein the priority level associated with the request is based on a type of operation that the first module resource plans to use the resource to perform.

11. The method of claim 1, comprising storing reservation data that indicates reservations of resources of the robot, tokens associated with the reservations, and priority levels for the reservations; and
wherein determining the priority level for the first reservation comprises retrieving, from the reservation data, a value indicating the priority level for the first reservation.

12. The method of claim 1, wherein the first module and the second module each have predetermined priority levels assigned, wherein the priority level for the first reservation is based on the predetermined priority level for the second module, and wherein the priority level for the request is based on the predetermined priority level for the first module.

13. A system comprising:
one or more computing devices; and
one or more computer-readable media storing instructions that are operable, when executed by the one or more computing devices, to cause the one or more computing devices to perform operations comprising:
receiving, by the one or more computing devices, a request to access or reserve access to a resource of a robot, the request being associated with a first module of the robot;
determining, by the one or more computing devices, a priority level associated with the request;
determining, by the one or more computing devices, that the priority level associated with the request exceeds a priority level of an existing first reservation that reserves access to the resource for a second module of the robot; and
in response to determining that the priority level associated with the request exceeds the priority level of the first reservation:
cancelling, by the one or more computing devices, the first reservation to remove authorization of the second module to access the resource of the robot; and
based on the request, generating, by the one or more computing devices, a second reservation that authorizes the first module to access to the resource of the robot.

14. The system of claim 13, wherein the one or more computing devices are one or more computing devices of the robot.

15. The system of claim 13, wherein the resource is a physical resource of the robot.

16. The system of claim 13, wherein the first module and the second module are different software applications of the robot.

17. The system of claim 13, further comprising notifying the second module that the first reservation is cancelled.

18. The system of claim 13, wherein the first reservation is associated with a corresponding token; and
wherein cancelling the first reservation comprises invalidating the token for the first reservation.

19. The system of claim 18, wherein generating the second reservation comprises:
associating a token with the second reservation; and
providing the token to the first module of the robot.

20. A system comprising:
one or more computing devices; and
one or more computer-readable media storing instructions that are operable, when executed by the one or more computing devices, to cause the one or more computing devices to perform operations comprising:
receiving, by the one or more computing devices, a request to access or reserve access to a resource of a robot, the request being associated with a first module of the robot;
determining, by the one or more computing devices, a priority level associated with the request;
determining, by the one or more computing devices, that the priority level associated with the request exceeds a priority level of an existing first reservation that reserves access to the resource for a second module of the robot; and
in response to determining that the priority level associated with the request exceeds the priority level of the first reservation:
cancelling, by the one or more computing devices, the first reservation to remove authorization of the second module to access the resource of the robot; and
based on the request, generating, by the one or more computing devices, a second reservation that authorizes the first module to access to the resource of the robot.

* * * * *